April 23, 1957     R. H. BLANKS, JR     2,789,356
SPRING LOADED FEELER GAUGE
Filed Jan. 11, 1954
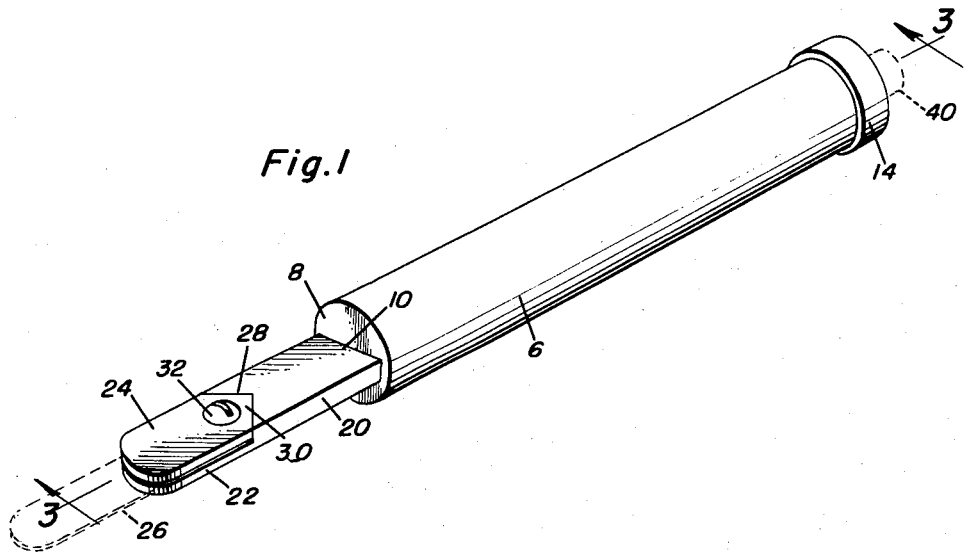
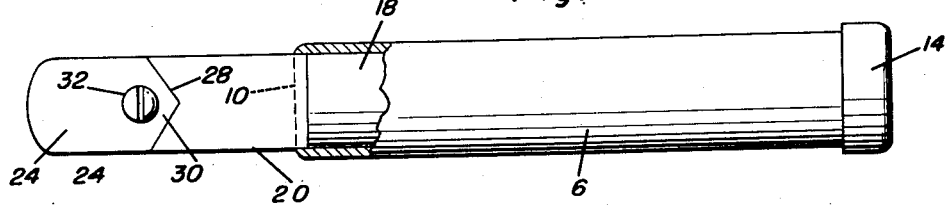
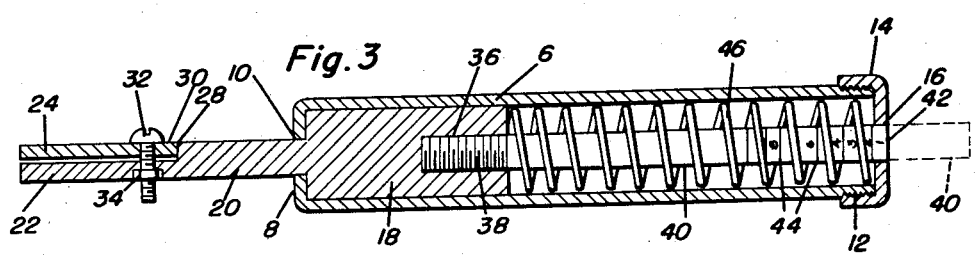
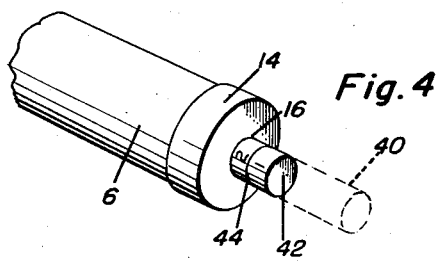
Richard H. Blanks, Jr.
INVENTOR.
BY

United States Patent Office 2,789,356
Patented Apr. 23, 1957

2,789,356
SPRING LOADED FEELER GAUGE
Richard H. Blanks, Jr., Clarksville, Va.

Application January 11, 1954, Serial No. 403,236

1 Claim. (Cl. 33—168)

The present invention relates to a feeler gauge, that is, a specially constructed and performing gauge which may be amply and reliably used to quickly and accurately ascertain the clearance space between a valve stem and an axially alined cooperating tappet therefor, and the purpose of the invention is to provide a gauge which is characterized by a spring loaded cylinder and jaw means for gripping and holding gauge elements of varying thicknesses.

Another object of the invention is to provide a feeler gauge having the aforementioned structural characteristics which is simple, practical, easy to handle, equally easy to assemble and repair, is not likely to get out of order, is such that it will withstand ordinary handling by average automobile mechanics and which, more importantly, is such in construction and operation that it provides an unusually handy and reliable instrumentality.

Along the same general lines it is an objective to improve upon and reduce the number of parts entering into the over-all combination, thereby not only increasing the efficiency of the structure as a whole, but also rendering the same less costly to manufacture and to otherwise simplify factors of assembling and sale and, what is just as important, to provide a construction in which manufacturers, retailers and users will find their respective requirements and needs effectually met.

Briefly summarized, the invention has to do with a cylinder having one end closed except for a limited slot, having the opposite end screw-threaded to accommodate a centrally apertured cap. A spring returned plunger is slidable in the cylinder and has a spring encircled rod at one end operating through the apertured cap and provided with appropriate graduations for easy reading and measuring purposes. The opposite end of the plunger takes the form of a reduced shank and this is slidable through the slotted end and has jaw means at its outer end to accommodate feeler gauge plates of varying thicknesses.

Other objects, features and advantages will become more readily apparent from the following description and the accompanying sheet of illustrative drawings.

In the drawings:

Figure 1 is a perspective view of a gauge constructed in accordance with the principles of the present invention.

Figure 2 is a view with portions in section.

Figure 3 is a view taken centrally with parts in section and elevation; and

Figure 4 is a fragmentary perspective view of what may be called the right hand or rear end, that is "right" in respect to the views appearing in the sheet of drawings.

Referring now to the drawings with the aid of reference numerals the cylinder or casing is denoted by the numeral 6 and this is of appropriate materials and size. The left hand end 8 is closed except for a central rectangular slot 10. The opposite end is screw threaded as at 12 to accommodate the readily attachable and detachable screw cap 14. This cap is centrally apertured as at 16 (Figures 3 and 4).

The plunger is a sectional or composite structural means. The body portion proper is denoted at 18 and this is preferably solid and is slidable in one end portion of the cylinder as best shown in Figures 2 and 3. It is provided with an extension 20 which may be called a projectable and retractable shank and which is preferably rectangular and is slidable back and forth through the accommodating slot 10. In further consideration of the shank, the outer end is notched to provide a reduced terminal portion 22 which cooperates with a similarly constructive complemental portion 24 and these portions may be referred to as assembling and clamping jaws for the gauge plate 26. More specifically, the intermediate upper portion of the shank is formed with a V-shaped accommodation notch 28 as best shown in Figures 1 and 2 to accommodate the V-shaped end portion 30 of the attachable and detachable jaw 24. The latter is held in place by a bolt 32 as best shown in Figure 3.

With further reference to the plunger means the inner end of the body portion has an axial, screw-threaded socket 36 to accommodate the screw-threaded end portion 38 of the cylindrical gauge rod 40. The latter has one end 42 normally flush with the apertured end of the cap 14 as shown in Figure 3. This end is provided with graduations 44 which register with the cap, the latter serving as a gauging index. The coil spring 46 is confined in the cylinder and surrounds the rod and bears at one end against the plunger head or body 18 and at the opposite end against the cap 14. Thus a simple spring loaded cylinder and plunger assembly provides a novel handling means having jaw means to accommodate the gauge element 26.

Those familiar with the problem at hand, specifically the use and difficulties attending the use of a feeler gauge appreciate that when the gauge is slid between the tappet end of the valve stem there is a noticeable drag on the feeler gauge itself which is difficult to determine by normal or natural feel. However, by using the tension or spring loaded gauge herein disclosed the drag on the feeler gauge will register on the tension gauge through the means as shown for example in full and dotted lines in Figure 4. Having adjusted the first valve with a drag feel the user need merely take the reading from the tension gauge to meet this first valve setting. With this feeler tension adjustment all valves will have the same drag-reading from the gauge thus making all adjustments the same and with no guess work. Each valve having the same gauge tension adjustment will be in exact time with another making the motor run smooth and perform longer.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claim.

What is claimed as new is a follows:

A feeler gauge of the class described comprising a cylinder having one end closed except for a non-circular slot and having the opposite end externally screw threaded and provided with a centrally apertured readily applicable and removable screw cap, a plunger having a body portion reciprocable in said cylinder and a shank portion slidable through and projecting outwardly beyond the slot, said shank portion being provided at its outer end with cooperating jaws for holding a gauge element therebetween, said body portion having an axial socket, a rod secured in said socket and slidable through an aperture provided therefor in said screw cap, and a coil spring in said cylinder encircling said rod and bearing against said body portion at one end and the interior of said cap at its other end.

References Cited in the file of this patent

UNITED STATES PATENTS

| | | |
|---|---|---|
| 763,076 | Spalding | June 21, 1904 |
| 1,837,556 | LeBlond | Dec. 22, 1931 |

FOREIGN PATENTS

| | | |
|---|---|---|
| 588,788 | Germany | Dec. 1, 1933 |